United States Patent
Nelson et al.

[15] 3,659,785
[45] May 2, 1972

[54] WEATHER MODIFICATION UTILIZING MICROENCAPSULATED MATERIAL

[72] Inventors: Loren D. Nelson, Lowell; Bernard A. Silverman, Natick, both of Mass.

[73] Assignee: The United States of America as represented by the Secretary of the Air Force

[22] Filed: Dec. 8, 1970

[21] Appl. No.: 96,147

[52] U.S. Cl. .........................................................239/2 R
[51] Int. Cl. ...................................................A01g 15/00
[58] Field of Search...........................239/2, 14; 117/100 B

[56] References Cited

UNITED STATES PATENTS

| | | | |
|---|---|---|---|
| 2,052,626 | 9/1936 | Houghton | 239/2 R |
| 2,232,728 | 2/1941 | Pleasants | 239/2 R |
| 2,835,530 | 5/1958 | Schneider | 239/2 R |
| 3,313,613 | 4/1967 | Green | 117/100 B |
| 3,423,199 | 1/1969 | Philen et al. | 117/100 B |
| 3,475,154 | 10/1969 | Kato | 117/100 B |
| 3,517,512 | 6/1970 | Anderson et al. | 239/2 R |
| 3,539,377 | 11/1970 | Steinle | 117/100 B |

Primary Examiner—M. Henson Wood, Jr.
Assistant Examiner—Edwin D. Grant
Attorney—Harry A. Herbert, Jr. and Sherman H. Goldman

[57] ABSTRACT

A fog and cloud seeding method and agent utilizing microencapsulation techniques whereby controlled seeding particle size for both dry initial particles and particles dispensed as solution droplets provides for the production and maintenance of a predetermined particle spectrum when using hygroscopic chemical compounds which are fragile, brittle or friable in crystalline structure. A hygroscopic chemical agent to be utilized in cloud or fog seeding is provided with a liquid permeable capsule shell such that optimization of particle size for improved seeding results is obtained.

4 Claims, 1 Drawing Figure

Patented May 2, 1972
3,659,785
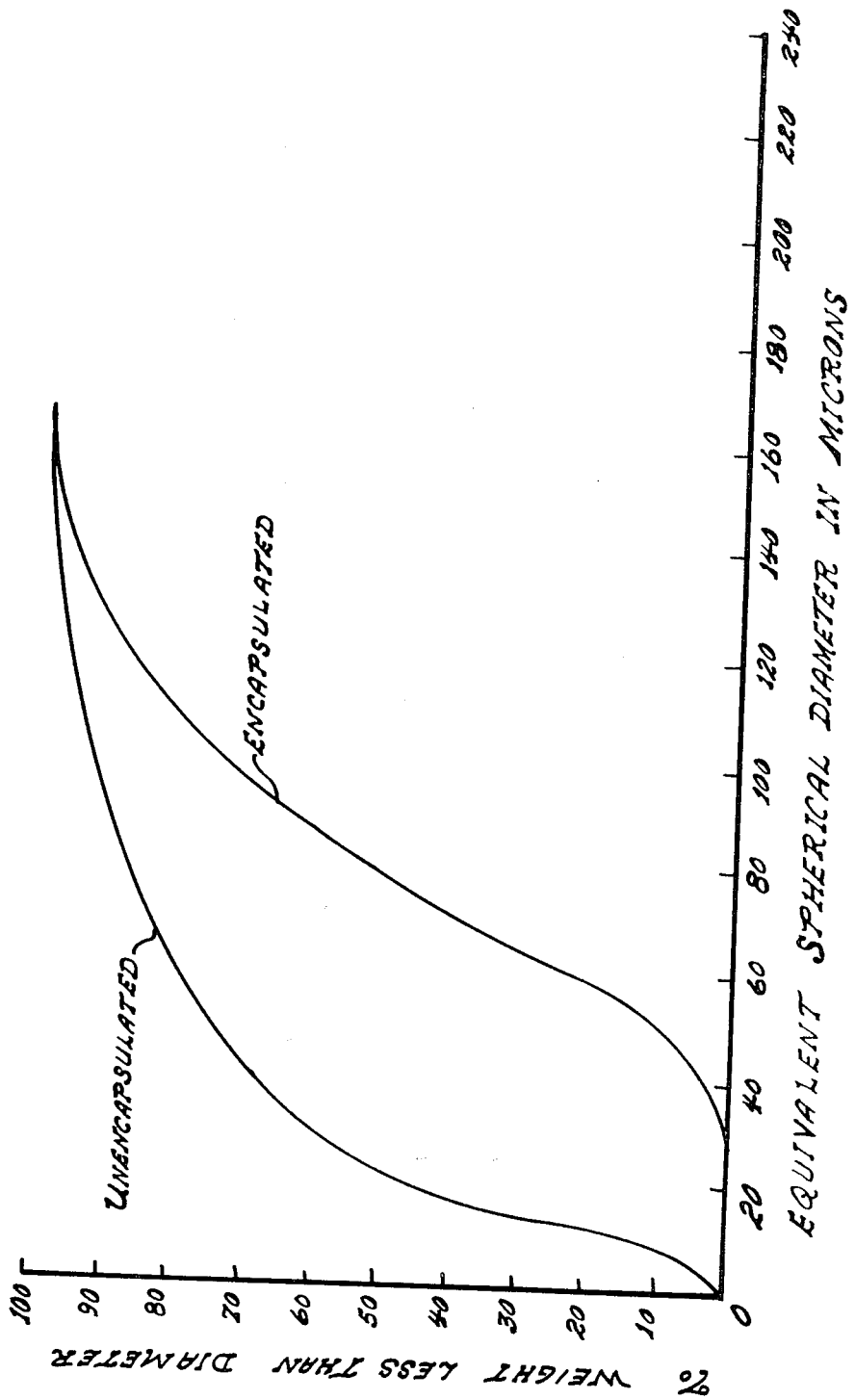
INVENTORS
LOREN D. NELSON AND
BERNARD A. SILVERMAN
BY Harry A. Herbert Jr.
Sherman H. Goldman
ATTORNEYS

WEATHER MODIFICATION UTILIZING MICROENCAPSULATED MATERIAL

BACKGROUND OF THE DISCLOSURE

This invention relates generally to weather modification and more particularly to a method of fog and cloud modification utilizing microencapsulated hygroscopic material of optimum particle size.

Previously, fog dissipation and cloud modification were found to be capable of achievement by altering the liquid and vapor phase equilibrium condition. Tests had been run and it was found that various materials were capable of reducing vapor pressure to dispel fog; however, these materials did not operate sufficiently well in practice to enable the opening of airports, harbors and roadways which were closed by virtue of the presence of fog.

Hygroscopic particles provide artificial nuclei to remove the moisture from the air, thereby lowering humidity and allowing for evaporation of the remaining moisture. The sweeping action of the falling droplets was also found to be a factor in providing for fog elimination. Particle size is important in that, for particular atmospheric conditions, the size must be large enough to be acted upon by gravity in order to reach the ground prior to the filling in of clear spaces by the fog. The failure of the prior art methods and agents adequately to achieve the desired fog dissipation was due to the hydroscopic nature of the materials to be used as seeding agents. This inherently causes agglomeration and clumping in storage, the hopper and feed mechanism of dispensing means such that the particle size of the agglomerated material is much greater than that which is effective for the purpose intended. Milling to obtain proper size control involves high costs without solving the degeneration during storage and utilization. Additionally, many desirable materials had to be omitted because the chemical compounds utilized were fragile, brittle or friable in crystalline structure, thus producing, during a milling operation, sizes too small to be effective in cloud seeding.

Size control of liquid sprays has proved to be difficult in that the equipment and the environment tend to cause variations which inhibit the desired could seeding operation. Composite particles consisting of several different immiscible compounds were previously required to be dispersed as liquid particles; however, nozzles which are capable of providing proper size do not have the capability for providing the prior rate for effective weather modification.

Additionally, prior art methods and techniques do not have the capability of providing a record of coalescence between the seeding particles for analysis in order to aid in the understanding of phenomena associated with weather modification.

SUMMARY OF THE INVENTION

All of the foregoing problems of weather modification by means of seeding agents have been overcome by the application of microencapsulation technology to this field.

Accordingly, it is an object of this invention to provide a fog and cloud seeding method which utilizes microencapsulated seeding agents.

It is another object of this invention to provide a technique for seeding fog and clouds whereby the particle size of both dry initial particles and particles dispensed as solution droplets are able to be controlled.

It is still another object of this invention to provide better control in seeding agents of the chemical activity and water absorption rates together with the properties of a given particle whereby optimization of the efficiency of the seeding agent may be obtained.

A further object of this invention involves the application of microencapsulation technology to seeding agents whereby delayed and/or controlled release of encapsulated material relative to particle residence time within the seeded area may be effected.

A still further object of this invention is to provide a weather modification technique and seeding agent which are easy and economical to produce of conventionally available materials that lend themselves to standard mass production manufacturing techniques.

Another still further object of this invention is to provide microencapsulated seed materials wherein the surface area of a given particle is increased to provide greater initial water uptake for a greater period of time rather than only during the core dissolution of previously utilized techniques.

Another object of this invention is to provide for weather modification materials having improved structural integrity, handling and flowability together with protection of the particles from splintering, clumping, premature water absorption and breakage during storage and dispersal.

Still another object of this invention involves the avoidance of very fine fragments and tiny crystals of cloud seeding agents by means of microencapsulation.

These and other advantages, features and objects of the invention will become more apparent from the following description of the preferred embodiments.

DESCRIPTION OF THE DRAWING

The FIGURE is a graphic representation of the particle spectrum for unencapsulated and microencapsulated urea.

DESCRIPTION OF THE PREFERRED EMBODIMENTS

Many materials having hygroscopic properties have been proposed for use in weather modification. Some of these are sodium chloride, calcium chloride, various hydroxides, disodium phosphate, ammonium nitrate, acetamide and urea. The use of hygroscopic seed materials for fog dissipation over harbors, highways and airports prohibits the use of those hygroscopic materials which are corrosive. Non-corrosive seed agents, such as urea, are generally crystalline in nature; therefore, milling to produce appropriate sizing also produces a large amount of particles which are considered too small for operative seeding techniques. Thus, fragile, brittle or friable crystalline structures have not been considered to be effective.

This invention provides size control and stabilization of seeding agents by utilizing microencapsulation technology for maintenance of a proper size spectrum. Crystalline urea utilizing microencapsulation has been found to be capable of providing warm fog dispersal in a weather modification program; however, particle size distribution and size range of the urea material is very important for obtaining effective results. Particles smaller than 15 microns in equivalent spherical diameter can cause a decrease in visibility when dispensed in fog, and particle sizes greater than about 150–160 microns in equivalent spherical diameter prove to be relatively ineffective. Breakage of urea crystals during handling and dissemination from a hopper, and degradation during storage are avoided by microencapsulation. The optimum size for weather modification has been found to be a function of the turbulent diffusion and wind shear within a cloud. A narrow range where a 40 micron size predominates provides excellent results in actual conditions with no shear situation and low turbulence, while a various range with a predominant size of 80 microns for shear cases and those with moderate turbulence proves to be most desirable. The range of particle equivalent spherical diameters from 15 to about 150 microns may be obtained by utilization of microencapsulation techniques. Furthermore, variations in the spectrum for a predominate size for particular water characteristics may also be obtained for optimum results. The microencapsulation technique in addition to eliminating entirely particles below 15 microns and being amenable to the obtaining of a predetermined, predominant size, has the further advantage of providing structural integrity to crystalline particles such that the spectrum range may be accurately controlled by mechanical sorting or sieving. Thus, the bulk of the seeding agent to be dispensed may be controlled to obtain a more efficient size of particle.

The Figure is a cumulative distribution graph illustrating comparative size spectra of raw urea and the same urea after being encapsulated, wherein the encapsulated material ranges from about 30–60 microns for a particular run. The scavenging effects of microencapsulation techniques produces stable, coated aggregates of crystals with the complete elimination of very fine crystals which eliminates the hinderance caused by these particles in improving visibility in fog dispersal. Coating the seeding agent does not inhibit bulk water uptake, although encapsulation prevents the formation of water to water interfaces in order to drastically reduce clumping or agglomeration. The main reason for maintaining a size above 15 microns is to enable the particle to grow large enough and fall through a cloud in a reasonable time in order to clear fog and improve visibility in a fog seeding attempt. The techniques of microencapsulation are fairly well developed. One technique for manufacturing encapsulated urea may be found in the patent application tilted "Manufacture of Minute Capsules En Masse" by Jerrold L. Anderson, Thomas C. Powell and Robert C. Hains Ser. No. 96,233 which is filed on even date herewith. Although ethylcellulose is proposed in the patent application as a nonsoluble material to form the encapsulation shell, it should be understood that any insoluble material which is permeable to water and the solution with the seeding agent can be utilized with this invention. Insolubility of the shell produces the advantage of having the empty shells available after the seeding action has taken place in order to analyze the distribution over the seeding area and to determine the number of capsule shells in a drizzle drop in order to understand better the phenomena in weather modification.

The invention thus far described refers to urea since it has the requisite hygroscopic properties in addition to being noncorrosive. Coating or encapsulation may also be applied to several different immiscible, crystalline, hygroscopic materials to take advantage of the synergistic effects such composite particles might have an improved water sorption properties over a single material. The encapsulation of urea and ammonium nitrate would be an example of this type of material. Prepackaged encapsulation liquid sprays also fall within the purview of this invention, an example of which would be urea and ammonium nitrate in a water solution. The advantage of prepackaged liquid sprays is that it provides not only for proper particle size but also enables the application of the material at a proper rate.

The dispensing of microencapsulated or coated seeding agents through a cloud or fog for weather modification has been shown by means of tests effectively to produce the results that heretofore have been unobtainable due to the improper size control and stabilization of seeding agents. Additionally, the encapsulated seeding agents may be dispensed with apparatus conventionally utilized in cloud seeding. The technique and agents utilized are particularly amenable to applications for dispersal of warm fog, which comprises ninety-five percent of the fogs in the United States. Additionally, optimization and evaluation of cumulus seeding may be obtained by the practice of this invention.

Although the invention has been described relative to particular embodiments, it should be understood that the invention is capable of a variety of alternative embodiments, for example, where corrosive seeding agents may be tolerated the technique may be applied to these materials. Also, the shell may have its permeability controlled such that delayed and/or controlled release of water take-up and dispensing of the capsule contents may be effected.

We claim:

1. A method of weather modification comprising removing water vapor from the atmosphere by dispensing in the atmosphere finely divided hygroscopic particulate material encapsulated in a moisture permeable coating.

2. A method as defined in claim 1 wherein said particulate material is substantially all of a size within the range of from 15 to about 150 microns equivalent spherical diameter.

3. A method as defined in claim 2 wherein the predominant size of said particulate material within said range is between 40 and 80 microns equivalent spherical diameter.

4. A method as defined in claim 1 wherein said particulate material is predominately within a narrow size spectrum, whose equivalent spherical diameter is between 40 and 80 microns.

* * * * *